2,712,534
ETHYLENE-ISOPROPANOL TELOMER ADDITIVE FOR UPGRADING PARAFFIN WAXES

Michael Erchak, Jr., Morris Plains, N. J., assignor to Allied Chemical & Dye Corporation, New York, N. Y., a corporation of New York No Drawing. Application October 5, 1951,
Serial No. 250,035

5 Claims. (Cl. 260—28.5)

This invention relates to a waxy product having valuable properties per se and in particular, having valuable properties as an additive to ordinary crystalline paraffin waxes and to microcrystalline paraffin waxes.

Crystalline and microcrystalline paraffin waxes have valuable properties for coating and impregnating purposes, e. g. for coating or impregnating fibers or porous materials such as paper, cork, etc., to impart thereto moisture resistance, chemical resistance, electrical insulating properties, etc. These waxes nevertheless have defects including excessive "tack" at ordinary and slightly elevated temperatures causing "blocking," i. e. sticking together of a pile of coated sheets at ordinary or slightly elevated temperatures; excessive brittleness resulting in the appearance of white cracks at folds in coated paper and accompanying increase in moisture-vapor transmission; and excessive softness resulting in relatively dull, easily marred finishes. These defects are associated with relatively low solidification points, relatively low molecular weights, and relatively high penetrability as measured by a standard needle under a standard load.

It has been proposed to upgrade waxes such as paraffin waxes by addition thereto of harder, higher melting natural or synthetic waxes. Natural waxes of superior properties are in general available only in limited quantities and at relatively high and fluctuating prices, and tend moreover to vary considerably from batch to batch in quality. There has consequently been continuing effort to develop synthetic waxes based on readily available raw materials and having desirable properties per se and for upgrading paraffin waxes.

Among properties required of a satisfactory additive for upgrading paraffin, compatibility with the paraffin is very important. A readily compatible additive can be blended in large or small proportions to provide a series of blends with a series of properties. Compatibility is related to composition and structural features including molecular weight.

Another important property is solidification point, low enough to allow liquefying the additive for blending purposes in simple blending apparatus such as low pressure steam apparatus, but high enough so that solidification points of blends will be reasonably high.

Greater block resistance and grease resistance in a wax appear to accompany greater hardness. Accordingly a compatible additive which increases hardness can improve both surface appearance and block resistance. It will normally be necessary that the additive itself be hard if it is to impart hardness to a wax compatible therewith.

Viscosity of the additive is another important property. For ease of blending with paraffin waxes, viscosity of the additive in the melt and in solution in paraffin wax should be relatively low at temperatures such as those reached in low pressure steam blending apparatus. Viscosity substantially higher than that of paraffin waxes combined with good compatibility are important properties affecting ability of the additive to improve paraffin wax flexibilities.

For some applications blends are desired which coat only the surface of a porous material and do not "strike through." It is therefore desirable that blends of greater viscosity than liquid paraffin itself be obtainable in order that a composition can be made up with the property of resistance to striking through.

Viscosity of polymers is related to average molecular weight, higher average molecular weights corresponding to higher viscosities, at least in comparisons between polymers differing only in chain length. Irregularities in viscosity-molecular weight relation (which are due to structural features such as chain branching, difference in terminal groups, etc.) are minimized in dilute solutions; accordingly one method of estimating molecular weights of polymers is based on measurement of viscosities in dilute solution. For practical applications it will be evident that concentrated solution and melt viscosities are frequently of importance. Straight-chain compounds tend to show less steep increases in viscosity with concentration than do their branched chain isomers.

One approach to synthetic waxes is preparation of a chemical individual such as for example a specific amide or ester of a specific mono-basic acid such as stearic and higher acids. Materials thus prepared tend to be of limited application and/or expensive.

Another approach is to use polymeric materials, consisting of mixtures of homologs differing in chain length and perhaps differing also to a minor extent in structure. Polymers have the advantage that they can be based on widely available raw materials but they introduce complications through the fact that they are not single compounds. Mixtures of polymeric homologs vary in properties, including the properties above-noted, according to the chemical composition and structure of the polymer chain unit. They also vary in properties according to the average molecular weight of the polymeric product; and they even vary in properties according to the distribution of molecular weights among the constituent homologs making up the polymer. Thus for example polymers identical in chemical composition and in structure of the chain unit, having identical dilute solution viscosity, can nevertheless differ in other properties including hardness and solidification point as a result of differences in molecular weight distribution among the homologous constituents.

I have now found a polymeric, waxy reaction product of ethylene with isopropanol meeting extremely well the criteria for upgrading other waxes, especially softer waxes including particularly hydrocarbon waxes such as paraffin waxes, and having valuable properties per se, consisting essentially of a mixture of homologs of the formula $CH_3(C_2H_4)_nC(OH)(CH_3)_2$, wherein the values of $n$ lie substantially entirely within the range of about 30 to about 150; which product has average molecular weight in the range between about 1500 and about 3000, solidification point in the range above 95° C. and below 110° C., preferably not above about 105° C., and hardness measured by penetration in 5 seconds of a standard needle under 200 grams load at 22° C. in the range between about 0.1 mm. and about 0.5 mm. Melt viscosities of the products are from about 125 to 700 centipoises at 250° F., 45–300 centipoises at 300° F., and 25–200 centipoises at 350° F. Particularly preferred products are those with average molecular weights of about 2000–2500, solidification points in the range between about 100° C. and about 105° C., and penetration hardness as above defined not above about 0.3 mm.

The above formula is that of a tertiary alcohol. Tertiary alcohols can be dehydrated by heating. Heating in course of preparation and ordinary use does not adversely affect my waxes but probably dehydrates at least a portion of the tertiary alcohols originally formed to the corresponding olefins of formula $$CH_3(C_2H_4)_nC(CH_3)=CH_2$$

Accordingly my waxes can be said to have the general formula $CH_3(C_2H_4)_nC(CH_3)=A_2$ where $A_2$ is selected from the group consisting of $(OH)(CH_3)$ and $(CH_2)$, and $n$ is defined as above.

The products of this invention, in line with their structure and molecular weights, have good compatibility with paraffin waxes as shown by cloud points; thus the products of this invention have cloud points not above about 100° C. in 50% solution in commercial paraffin wax. Viscosities of the products of the present invention in 50% solution in commercial paraffin wax range from about 60 to 170 Saybolt Universal seconds at 121° C. (250° F.), about 40 to 120 Saybolt Universal seconds at 149° C. (300° F.), and about 25 to 75 Saybolt Universal seconds at 177° C. (350° F.).

Methods for determinations of properties stated herein were in accordance with the Standards of the American Society for Testing Materials and were as follows:

Cloud point is the temperature at which the first visible haze is noticeable upon cooling slowly.

Viscosities were determined with Saybolt Universal and Furol viscosimeters and with Brookfield viscometer for absolute units. Roughly, Saybolt Universal seconds divided by 4 gives absolute units in centipoises and Saybolt Furol seconds multiplied by 2 gives absolute units in centipoises.

Molecular weights were determined from viscosity measurements at about ½% concentrations in tetralin solutions at about 75° C. or in xylene solutions at about 85° C. using the Staudinger equation in the form:

$$\text{Molecular weight} = \frac{Nsp}{K_m C}$$

wherein $Nsp$ = (viscosity of solution - viscosity of solvent)/viscosity of solvent.
$K_m = 0.85 \times 10^{-4}$.
$C$ = concentration of the solution expressed as the number of mols of the chain unit, $CH_2$, per liter.

Solidification points were determined by the method described for paraffin waxes in A. S. T. M. Standards, 1944, Part III, page 211, published by the American Society for Testing Materials.

Penetration hardnesses were determined on a Krebs penetrometer using an A. S. T. M. needle with 200 grams load applied for 5 seconds or 30 seconds at 22° C. (75° F.). Penetrations reached in 30 seconds did not differ substantially from those reached in 5 seconds.

The following examples illustrate the effect of a wax product in accordance with my invention, when blended with paraffin, upon the solidification point and penetration hardness of the paraffin.

*Example 1.*—Ordinary crystalline paraffin wax with a solidification point of 52° C. and hardness corresponding to a penetration of about 2.8 mm. was blended with a waxy ethylene-ispropanol product in accordance with this invention having solidification point of 105° C. and hardness corresponding to penetration on the basis above-described of about 0.25 mm. The following table shows the effect on solidification point and hardness of successive additions of my wax to the paraffin wax.

TABLE I

*Solidification point and hardness of mixtures of paraffin and ethylene-isopropanol wax*

| Paraffin, Percent | Solidification Point (° C.) | Penetration (mm.) |
| --- | --- | --- |
| 100 | 52 | 2.8 |
| 90 | 56 | 1.9 |
| 80 | 63 | 1.6 |
| 60 | 80 | 0.95 |
| 50 | 86 | 0.65 |
| 40 | 93 | 0.45 |
| 20 | 99 | 0.4 |
| 0 | 105 | 0.25 |

It will be noted from the table that minor proportions of my wax resulted in considerably greater changes in hardening the blends than are produced upon such further additions of my wax as bring my wax much above major proportions of the composition. Thus in a composition containing 20% of my wax, the penetration was changed by ca. 1.2 mm. over that of the pure natural wax, whereas the last 20% of my wax (taking the composition from 80% to 100% synthetic) changes the penetration by only ca. 0.15 mm.

Synthetic wax having blending properties as illustrated in this example can be prepared as described below and specifically illustrated in Example 5 below.

Blends containing my wax, such as those set out in the above table, resemble high quality microcrystalline paraffin wax in solidification point and hardness. Moreover they show several advantages over microcrystalline wax: for example, they are pure white in color and they show very little or no tackiness whereas microcrystalline waxes are frequently amber colored and frequently show undesirable tackiness. Blends containing my wax admixed with crystalline paraffin wax show greater scratch resistance than microcrystalline paraffin waxes having the same melting range.

*Example 2.*—10% of my wax of like properties to that of the preceding example was blended with 90% of a microcrystalline paraffin wax having a solidification point of 77° C. and a hardness corresponding as above to penetration of about 3.5 mm. A much harder wax composition resulted, having hardness corresponding as above to penetration of about 2.6 mm., and having a solidification point of 70° C. Moreover the tackiness of the blend was slight, whereas the pure microcrystalline wax component was very tacky. The tensile strength of the blend appeared to be higher than that of the pure microcrystalline wax.

The wax blends of Examples 1 and 2 above have been found very suitable in viscosity, flexibility, toughness and electrical properties for coating paper by for example the hot dip method.

The wax products of my invention are also useful per se in view of their hardness, chemical resistance, solubilities, electrical properties, etc. They can readily be dissolved in non-polar organic solvents such as toluene, xylene, carbon tetrachloride and trichloroethylene at elevated temperatures such as 70° C. and above but have low solubilities (less than 2 grams per 100 cc.) therein at temperatures below about 50° C. In dispersed form they have good retention for non-polar solvents and accordingly can be made up in paste form with these solvents. Their solubilities in polar solvents are very slight (less than 0.1 gram per 100 cc.). In tests over frequency ranges from 1000–100,000 cycles per second, the values of their di-electric constants and power factors are substantially the same as the values for refined white microcrystalline waxes.

The products of the present invention can be prepared under selected conditions of temperature, pressure and proportion of isopropanol using a free radical generating catalyst chosen to give smooth reaction, having regard to the temperatures and pressures employed. For example, an ethylene-isopropanol wax in accordance with this invention can be prepared under conditions within the ranges disclosed in my United States Patent 2,504,400 of April 18, 1950; but only certain combinations of conditions within the ranges disclosed in said patent will lead to a product in accordance with this invention.

Preferred processes for preparing products in accordance with the present invention involve continuous operation with substantially all ethylene, isopropanol, and catalyst in substantially homogeneous vapor phase, whereby substantially all of the reaction occurs in vapor phase under uniform temperature, pressure and concentration conditions. Average temperatures in the reaction zone are maintained in the range between about 170° and about 200° C. with temperature fluctuations from point to point in the reactor and from time to time at any given point maintained substantially within a range of not more than about ±10° C., preferably within ±5° C. Preferred average temperatures are in the range between about 180° C. and about 200° C.

Average pressures are maintained in the range between about 5000 p. s. i. and 7000 p. s. i., preferably between about 6200 and about 6800 p. s. i., with fluctuations not greater than ±200 p. s. i., preferably not greater than ±100 p. s. i.

The isopropanol is injected into the reaction vessel in amounts correlated with rate of withdrawal of product and unreacted isopropanol, maintaining liquid volumes of isopropanol, measured at room temperatures, between about 5% and about 15% of the volume of the reaction vessel. Samples of gas withdrawn from the center of the reactor accordingly should contain condensible liquid in amounts of about 5 to 50 cc. and preferably in the range between about 10 cc. and about 35 cc. with preferably not more than about ±5 cc. range of fluctuation about the average, per 100 liters of gas withdrawn, said volumes of condensible liquid being measured at room temperatures (20° C.) and said volumes of gas being measured at N. T. P., i. e. at 0° C. and 760 mm. of mercury pressure. Suitable injection rates are between about 25 and about 150 volumes of liquid isopropanol per hour per 10,000 volumes of reaction space. Generally, higher injection rates are used the higher the average temperatures.

Higher injection rates, higher temperatures and higher catalyst concentrations tend to promote higher production rates but if not closely controlled may lead to waxes of greater than 0.5 mm. penetration and may lead to runaway, explosive reaction.

To assure substantial homogeneity of the vapor phase, the vapor phase should be maintained in a state of turbulence, e. g. by mechanical agitation as with a churn type or rotary stirrer. Homogeneity can be further promoted by other means, e. g. by injection of isopropanol, suitably containing dissolved catalyst, at multiple points within the reactor.

A free-radical generating catalyst is present in my process. This class of catalyst is broadly known and includes types such as peroxy, azo, organo-metallic, perhalogen, ultraviolet light-photosensitizer, etc. Catalysts chosen from these groups vary widely in thermal stability.

For my purpose, choice of catalyst is governed principally by employment of 170°–200° C. temperatures, i. e. by thermal stability. A catalyst of too slight thermal stability will decompose practically instantaneously in the 170°–200° C. temperature range, either failing to effect polymerization or causing sudden, uncontrollable reaction. Too stable a catalyst will be ineffective. A catalyst is usually chosen which decomposes at a measurable rate upon being subjected to temperatures in the range between about 170° C. and about 200° C. The rate of catalyst decomposition can include an "induction period" during which decomposition is relatively slow or negligible; and in fact induction periods of say 1 second–5 minutes can be of advantage in giving time for dispersal of the catalyst homogeneously into the vapor phase before catalyst decomposition becomes rapid.

Catalyst concentrations influence product properties as well as production rates. Concentrations giving favorable properties and rates are usually in the range between about 1.0 and about 8.0 grams per 100 cc. of liquid isopropanol, preferably in the range between about 2 and about 5 grams per 100 cc. of liquid isopropanol.

Generally speaking hydroperoxide catalysts are preferred, such as hydrogen peroxide, cumene hydroperoxide and tertiary butyl hydroperoxide, and crude petroleum hydroperoxide; hydroperoxide derivatives such as di-tertiary butyl peroxide can also be used.

Factors which tend to produce waxes of greatest hardness include lower operating temperatures, higher pressures, lower catalyst concentrations, and lower isopropanol concentrations. These same factors tend, however, to produce high molecular weight plastic polyethylene as a by-product along with my waxes. Formation of this plastic polyethylene by-product is undesirable because it can complicate control of wax properties, e. g. by increasing the product viscosity, and also because it coats the thermocouple wells and cooling coils of the reactor and interferes with temperature control. Temperatures may then fall too low with resulting more rapid production of plastic vs. wax; and may rise too high with resulting explosion. Accordingly it will be appreciated that conditions for obtainment of a hard wax with penetration below about 0.5 mm., in a continuous process, are critical.

According to a further feature of my preferred process for the hard waxes of this invention, I inject benzene continuously or intermittently into the reactor. I have found that benzene does not depreciate the properties of the wax or interfere in the above-outlined process, but does dissolve any small amounts of the polyethylene plastic which may form and coat the thermocouple well, cooling coils, etc. Thereby I obviate the above noted difficulties which may develop in maintaining temperature control in my process, especially when the hardest grades of my waxes are being produced.

In preferred operations for manufacturing the wax product of this invention, wax is withdrawn from the reaction zone approximately at the rate at which it is formed together with unreacted ethylene in weight ratios of wax:unreacted ethylene of at least about 1:1. Preferably only unreacted ethylene dissolved or entrained in the wax phase is withdrawn, whereby weight ratios of wax:ethylene are at least about 3:1.

Preferably the ethylene in the vapor phase in the reactor contains not more than about 20% of gaseous impurities which normally accompany ethylene such as nitrogen, methane, ethane, and propylene and usually trace amounts of oxygen. Accordingly the ethylene introduced into the reactor should be at least about 90% pure so that at least about 50% conversion can be attained when impurity content reaches about 20%. Preferably ethylene of at least about 95% purity is used.

The following examples illustrate continuous production of wax products of this invention but are not to be interpreted in a limiting sense.

*Example 4.*—A stainless steel reactor of 10" internal diameter and 40" in length (56,640 cc. volume) fitted with stirrer, was heated to about 185° C. and charged under 6200 p. s. i. with commercial 97% pure ethylene and with 4500 cc. isopropanol containing 0.5 volume percent hydrogen peroxide and 0.5 volume percent water. As soon as the reaction started as shown by a temperature rise (almost immediately) a mixture of isopropanol, water, unreacted ethylene, inerts and wax was withdrawn continuously from the bottom of the reactor. Simultaneously, make-up isopropanol-aqueous peroxide solution and ethylene were injected into the top of the reactor. Reaction temperature was maintained at 197°±3° C. and pressure at 6200±100 p. s. i. by automatic control. A continuous injection rate of 750 cc./hr. of isopropanol solution containing 3.0% hydrogen peroxide and 3.0% water resulted in the production of hard, milk-white wax at a rate of about 12 to 14 lbs./hr. Penetration hardness of this material was about 0.4 mm.; viscosity at 140° C. was about 45 Saybolt Furol seconds; and solidification point was about 100°–102° C. Conversion was maintained at about 80%, i. e. the weight ratio of wax:unreacted ethylene in the product withdrawn from the reactor was about 4:1.

*Example 4.*—A wax having a penetration hardness of 0.2 mm., a Saybolt viscosity at 140° C. of about 60 seconds (Furol) and a solidification point of about 105° C. was obtained when the reaction temperature was dropped to 185°±3° C. and the pressure was increased to 6800±100 p. s. i. using otherwise the conditions of Example 3. Production under these conditions was about 10 lbs./hr.

*Example 5.*—Reaction was carried out as outlined in Example 3 above except that reaction temperatures were about 185–190° C., pressures were about 6900 p. s. i., and injection rates of isopropanol-aqueous hydrogen peroxide solution were about 700 cc. per hour with hydrogen peroxide concentration and water concentration each about 3.5% by volume.

Under these conditions wax of milk-white color was produced in conversions per pass of 75–80% and at a rate above 12 pounds per hour. Penetration hardness of this wax was about 0.25 mm., Saybolt viscosity at 140° C. was about 68 seconds (Furol), and solidification point was about 105° C.

When temperatures were maintained in the range 180–185° C. under otherwise the conditions of the above Example 5, production rate was somewhat lower, about 10 pounds per hour, and viscosity of wax varied between 50 and 70 seconds (Furol) at 140° C., with penetration hardness about 0.25 mm. and solidification point in the same range as in the preceding examples, i. e. in the range between about 100° C. and about 105° C.

Waxes as disclosed in the above Examples 1–5 have been found to have excellent blending characteristics with paraffin waxes and to confer on the blends improved properties including marked reduction in tack and blocking tendency; also greatly improved grease resistance. Thus 1% of a wax product such as that of Example 3 blended with paraffin increased the grease resistance time of paper coated with the blend from 9 minutes for straight paraffin coating to 30 minutes in a standard test; and 1% of a wax product such as those of Examples 4 and 5 blended with paraffin similarly gave a time of 40 minutes. Flexibility of a wax blend coating of 50% microcrystalline paraffin wax–50% wax of Examples 1 and 2 was observed to be decidedly better than for the straight microcrystalline paraffin wax coating in tests wherein coated paper was wrapped around a conical mandrel and the point at which rupture of the coat appeared was noted.

This application is a continuation-in-part of my copending application Serial No. 150,799, now abandoned, filed March 20, 1950 which in turn was a continuation-in-part of my application copending therewith, Serial No. 789,329, filed December 2, 1947 now U. S. P. 2,504,400 of April 18, 1950. Continuous processes with agitation in which a homogeneous vapor phase is maintained in the reaction vessel and high conversions of ethylene per pass to wax are effected, in accordance with Examples 3, 4 and 5 above, are disclosed and claimed in my copending application Serial No. 270,255, filed February 6, 1952.

I claim:

1. A polymeric, waxy reaction product of ethylene with isopropanol consisting essentially of a mixture of homologs of the formula $CH_3(C_2H_4)_nC(CH_3)=A_2$ wherein the values of $n$ lie substantially entirely within the range of about 30 to about 150 and $A_2$ is selected from the group consisting of $(OH)(CH_3)$ and $(CH_2)$; which product has average molecular weight as determined by viscosity measurements in dilute solutions in the range between about 1500 and about 3000, solidification point in the range above 95° C. and below 110° C., and hardness measured by penetration in 5 seconds by a standard needle under 200 grams load at 22° C. in the range between about 0.1 mm. and about 0.5 mm.

2. Product as defined in claim 1 which consists essentially of a mixture of homologs of the formula $$CH_3(C_2H_4)_nC(OH)(CH_3)_2$$

3. Product as defined in claim 1 consisting essentially of a mixture of homologs of the formula $$CH_3(C_2H_4)_nC(OH)(CH_3)_2$$

and having average molecular weight determined by viscosity measurements in dilute solution of about 2000–2500, solidification point in the range between about 100° C. and about 105° C., penetration hardness under 200 gm. load in 5 seconds at 22° C. not above about 0.3 mm., and melt viscosities of from about 125 to 700 centipoises at 250° F., 45 to 300 centipoises at 300° F. and 25 to 200 centipoises at 350° F.

4. A composition of matter wherein the reaction product defined in claim 1 is blended with another wax.

5. A composition of matter wherein the reaction product defined in claim 3 is blended with a paraffin wax and amounts to not more than about 50% by weight of the composition.

References Cited in the file of this patent

UNITED STATES PATENTS

| | | |
|---|---|---|
| 2,409,683 | Howk et al. | Oct. 22, 1946 |
| 2,504,400 | Erchak, Jr. | Apr. 18, 1950 |